United States Patent
Hsu

(10) Patent No.: US 8,454,085 B1
(45) Date of Patent: Jun. 4, 2013

(54) VEHICLE SEATS HAVING UPWARDLY EXTENDING SIDE GUARDS

(76) Inventor: Wei K. Hsu, Garland, TX (US)

( * ) Notice: Subject to any disclaimer, the term of this patent is extended or adjusted under 35 U.S.C. 154(b) by 0 days.

(21) Appl. No.: 13/458,246

(22) Filed: Apr. 27, 2012

Related U.S. Application Data

(60) Provisional application No. 61/637,251, filed on Apr. 23, 2012.

(51) Int. Cl.
*A47C 7/62* (2006.01)
*A47C 31/11* (2006.01)
*A47C 15/00* (2006.01)

(52) U.S. Cl.
USPC .................. 297/182; 297/188.01; 297/188.2; 297/228.12

(58) Field of Classification Search
USPC ..................... 297/182, 228.12, 188.01, 188.2
See application file for complete search history.

(56) References Cited

U.S. PATENT DOCUMENTS

| 1,704,703 | A | | 3/1929 | Fry | |
|---|---|---|---|---|---|
| 1,951,631 | A | | 3/1934 | Sallop | |
| 2,313,878 | A | | 3/1943 | Kline | |
| 2,531,096 | A | | 11/1950 | Alters | |
| 2,637,373 | A | | 5/1953 | Willetts | |
| 5,125,121 | A | * | 6/1992 | Wroble | 5/484 |
| 5,161,854 | A | * | 11/1992 | Yokoto et al. | 297/182 |
| 5,354,119 | A | | 10/1994 | Nicholas | |
| 5,383,727 | A | * | 1/1995 | Rife | 383/11 |
| 5,549,353 | A | * | 8/1996 | Gaudet et al. | 297/182 |
| 6,079,773 | A | | 6/2000 | Hassan | |
| 6,276,582 | B1 | | 8/2001 | Alexander | |
| 6,742,837 | B1 | * | 6/2004 | Alexander | 297/188.2 X |
| 7,309,102 | B1 | | 12/2007 | Davis | |
| 7,311,356 | B2 | | 12/2007 | Pudney | |
| 7,422,278 | B2 | * | 9/2008 | McConnell et al. | 297/182 |
| 7,429,078 | B1 | * | 9/2008 | Tarlow et al. | 297/188.2 |
| 7,527,314 | B2 | * | 5/2009 | Dohan | 296/37.8 |
| 7,681,292 | B2 | * | 3/2010 | McConnell et al. | 297/182 X |
| 7,758,090 | B2 | * | 7/2010 | Gregory | 297/182 X |
| 8,042,241 | B2 | * | 10/2011 | McConnell et al. | 297/182 X |
| 8,162,189 | B2 | * | 4/2012 | Robins | 297/182 X |
| 2002/0167214 | A1 | | 11/2002 | Nelson et al. | |
| 2003/0205921 | A1 | * | 11/2003 | McConnell et al. | 297/182 X |
| 2006/0049674 | A1 | * | 3/2006 | Fair | 297/182 X |
| 2006/0082196 | A1 | * | 4/2006 | McConnell et al. | 297/182 |

(Continued)

FOREIGN PATENT DOCUMENTS

| JP | 2002-104077 A | 4/2002 |
|---|---|---|
| JP | 2006-025842 A | 2/2006 |

*Primary Examiner* — Rodney B White
(74) *Attorney, Agent, or Firm* — Grady K. Bergen; Griggs Bergen LLP

(57) ABSTRACT

A seat or seat cover having an integral or detachable upwardly extending wall subassembly particularly advantageous for use on a vehicle seat to prevent items from falling into the gap defined by the seat and console of a vehicle and the gap defined by the seat and door of the vehicle. The seat preferably has a flap installed thereon to which the wall assembly may be attached and detached. In another embodiment, the flap may conceal an area on the seat adapted to secure to the wall assembly. A seat cover may have an integral wall subassembly on one or both sides secured to its seams. In another embodiment, a conversion kit for seats which do not have flaps is provided wherein a securement means may be attached to one or both sides of a vehicle seat and said wall assembly attached thereto.

14 Claims, 5 Drawing Sheets

U.S. PATENT DOCUMENTS

| | | | |
|---|---|---|---|
| 2007/0241581 A1* | 10/2007 | Martin | 296/37.8 |
| 2010/0187869 A1* | 7/2010 | McConnell et al. | 297/182 |
| 2010/0231010 A1* | 9/2010 | Manley | 297/182 |
| 2012/0038189 A1* | 2/2012 | McConnell et al. | 297/182 |
| 2012/0235451 A1* | 9/2012 | Hrdlicka | 297/188.01 |
| 2012/0242115 A1* | 9/2012 | Schreiber | 297/188.01 X |

* cited by examiner

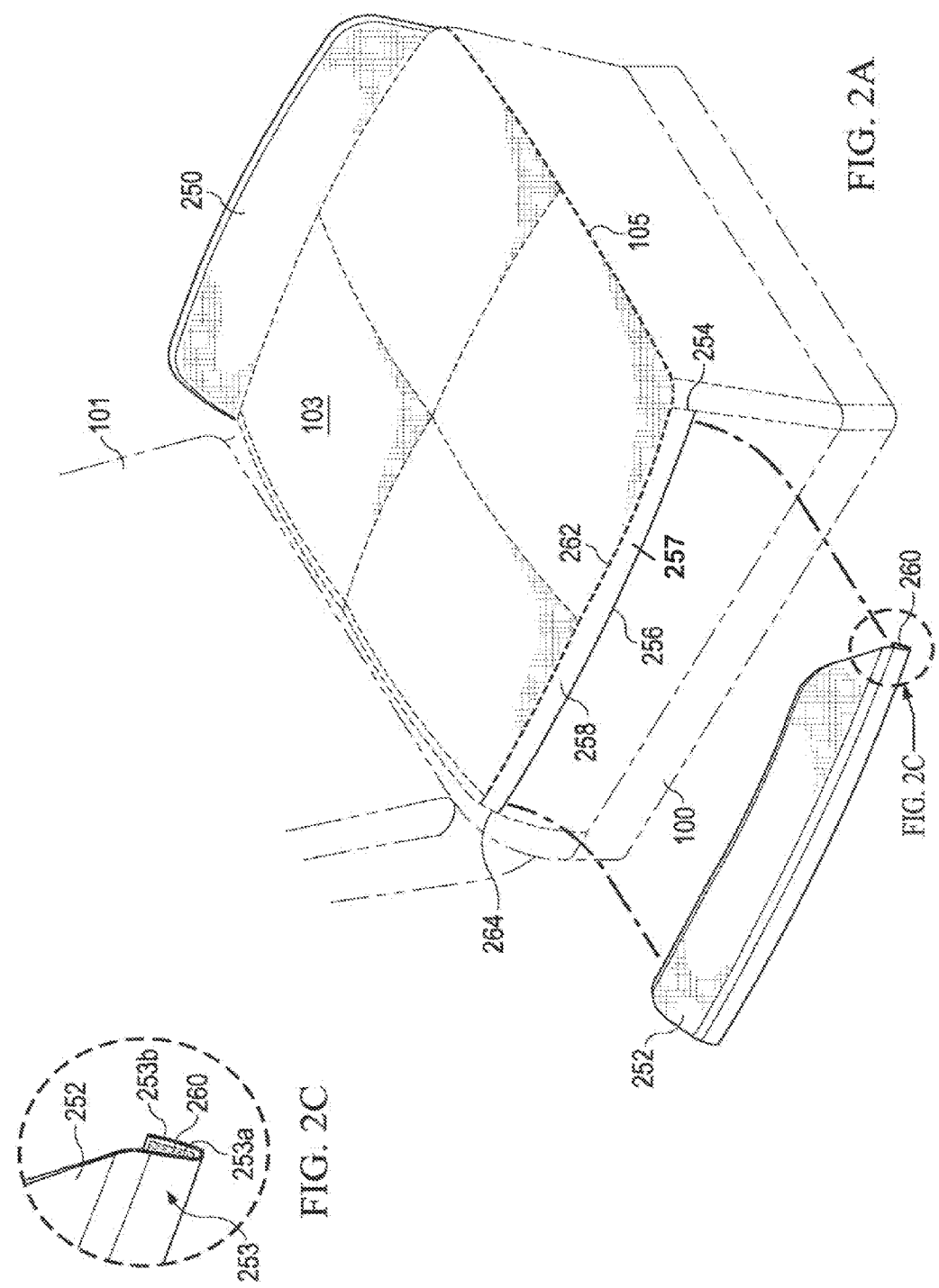

VEHICLE SEATS HAVING UPWARDLY EXTENDING SIDE GUARDS

CROSS REFERENCE TO RELATED APPLICATIONS

This application claims the benefit of U.S. Provisional Application 61/637,251, filed Apr. 23, 2012.

STATEMENT REGARDING FEDERALLY SPONSORED RESEARCH OR DEVELOPMENT

Not applicable.

TECHNICAL FIELD

This invention relates to the field of seat covers and seat accessories, particularly for vehicles.

BACKGROUND OF THE INVENTION

Most passenger vehicles provide individual front seats for the driver and passenger, and such seats have a medial side (near the midline of the vehicle) and a door side. The vehicle often includes a console between the passenger and driver seats, and the console is adjacent the respective medial sides of the passenger and driver seats. The console may include the gear shift of the car, audio means, and storage areas.

The interior of the car door and the door side of the vehicle seat define a first gap, and the console and the medial side of the vehicle seat define a second gap. These gaps generally extend downwardly to the floor of the passenger vehicle.

Objects carried into the vehicle often fall into the first or second gaps, making them difficult to retrieve. The objects may become wedged between the seat and another structure in the car or roll under the seat.

BRIEF DESCRIPTION OF THE DRAWINGS

FIG. 2A is a front perspective view of another embodiment of the invention with a portion incorporated into a typical automobile seat upholstery FIG. 2C is a magnified view of the guard attachment area as indicated by the circled portion.

DETAILED DESCRIPTION

Seats or seat covers having integral or removable upwardly extending seat side walls are disclosed. The seat side walls prevent objects from falling into the gaps between the seat and the interior door and the seat and the interior console.

The features of the invention may be included in the upholstery of a vehicle seat or embodied in an after-market seat cover. A conversion kit comprising a wall subassembly and attachment means is also disclosed. The features of the invention are detailed in the following paragraphs.

Figure 1:
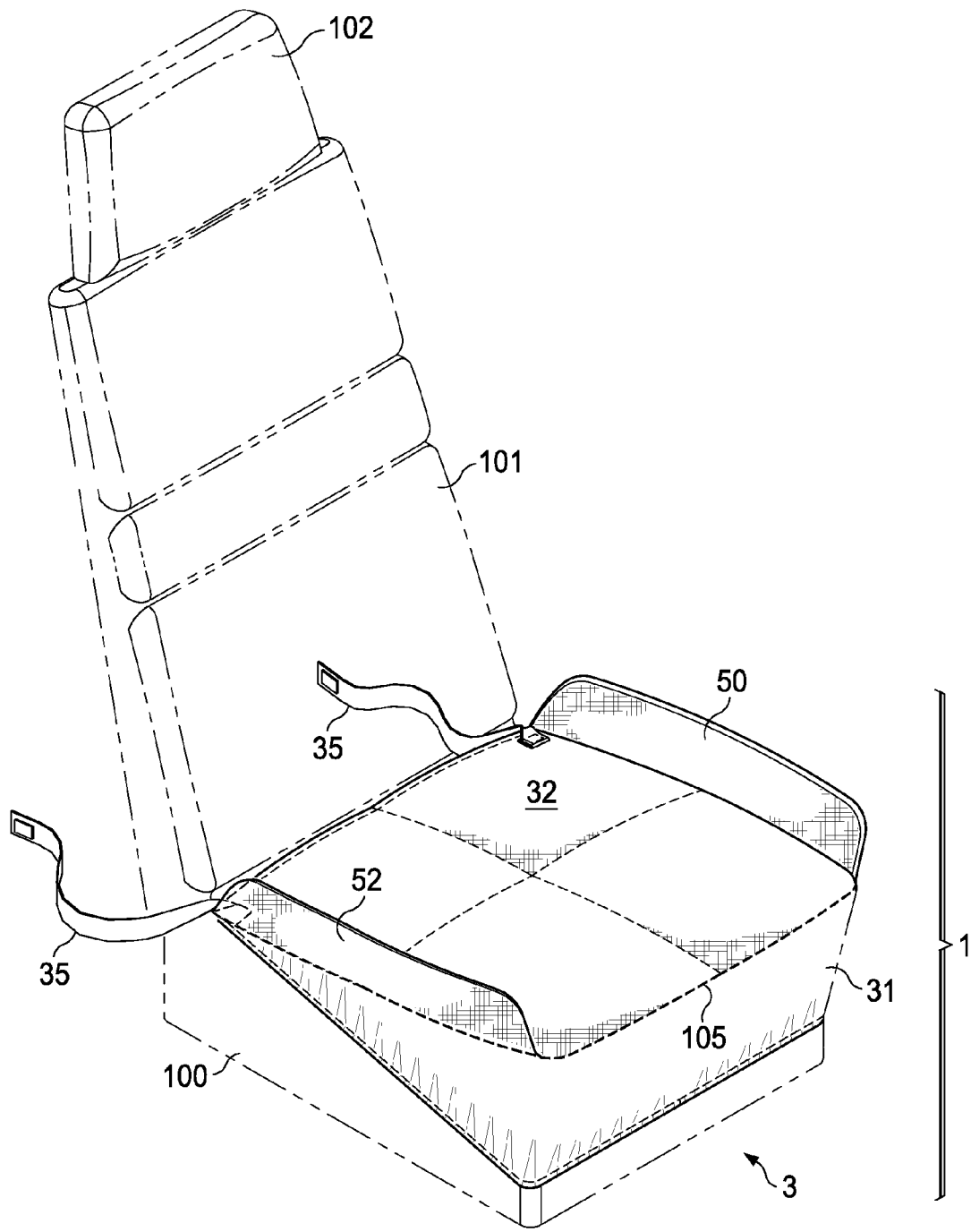
FIG. 1 is a front perspective exploded view of an embodiment of the invention in use with a typical automobile seat.

Referring to FIG. 1, a seat or seat cover embodiment having integral seat side walls/guards 1 is shown. The embodiment shown comprises two walls 50 and 52 and a seat cover portion 3. Seat cover portion 3 comprises a cover section 31, middle section 32, and seat straps 35. Walls/guards 50 and 52 preferably comprise a soft semi-sturdy material which retains its structure and remains in an essentially upwardly extending configuration during use, but allows for temporary compression if, for example, sat upon by a user. The walls/guards 50 and 52 have an upper edge, a bottom edge, and two side edges therebetween. For a driver's seat of a vehicle, guard 50 in use is adjacent a first gap defined by the door side of a vehicle driver's seat and the inside of the passenger door. Guard 52 in use is adjacent a second gap defined by the medial side of a vehicle seat and a console in the car. For a passenger seat, guard 52 is adjacent the first gap defined by the door side of the vehicle and the door side of the vehicle passenger seat and guard 50 is adjacent the second gap defined by the medial side of the passenger seat and the vehicle's console.

In the embodiment shown in FIG. 1, the wall/guard is permanently secured to a seat cover by sewing, gluing, or otherwise attaching the bottom edge of the guard into a seat cover seam 105. In such case, an after-market seat cover with integral guards can be placed onto the vehicle seat so as to cover it, and the guards will be in upright position and ready to use. In case of being used in upholstery, the seat as a whole incorporates the walls/guards in a seam of the upholstery similar to the position of seam 105 in the after-market seat cover.

Walls/guards 50 and 52 do not interfere with any safety apparatuses of the seat nor cause discomfort to the passenger. When in use, walls/guards 50 and 52 assist in preventing any items (e.g. keys, phone, etc.) that may fall down the first and second gaps defined by the sides of the seat and the passenger door or consoles of the vehicle.

Another embodiment may comprise a seat cover having a wall/guard as described above, and further comprising a seat cover portion that covers seat back 101 shown in FIG. 1.

FIGS. 2A through 2C and FIGS. 3A though 3B are alternate embodiments of the invention. In these embodiments, the upholstery of the vehicle seat has a medial side flap, a door side flap, or both incorporated into the upholstery. The wall/guard in these embodiments is removably attachable and detachable to the upholstery of a vehicle seat.

A first alternate embodiment comprises detachable walls/guards 250 and 252, which are securable to a flap 258 or the vehicle seat side wall. Flap 258 may be installed on one or both sides of the vehicle seat. If guards 250 and 252 are both to be used, a flap 258 is installed on both the medial side and the door side of the seat adjacent the sitting surface 103 and the sides of the vehicle seat. The attachment of wall/guard 252 to flap 258 or vehicle seat side wall is illustrated in FIG. 2A (unattached) and FIG. 2B (attached).

Upholstery sitting area 103 has a seat seam 105. Flap 258 comprises a top edge 262, side edges 254 and 264, a bottom edge 256, an outer side and an underside. Seat seam 105 secures to said top edge 262 to create a joined seam. Preferably, top edge 262 is sewn into vehicle seam 105 as shown, but other types of attachment may be used such as adhesive. Side edges 254 and 264 of flap 258 are secured to the seat upholstery, preferably sewn into a seam, so that flap 258 is secured on three sides to the vehicle seat and unsecured on the remaining edge 256. This creates a shallow inverted pocket 257 on the seat to receive bent end of the wall/guard.

Figure 2B:
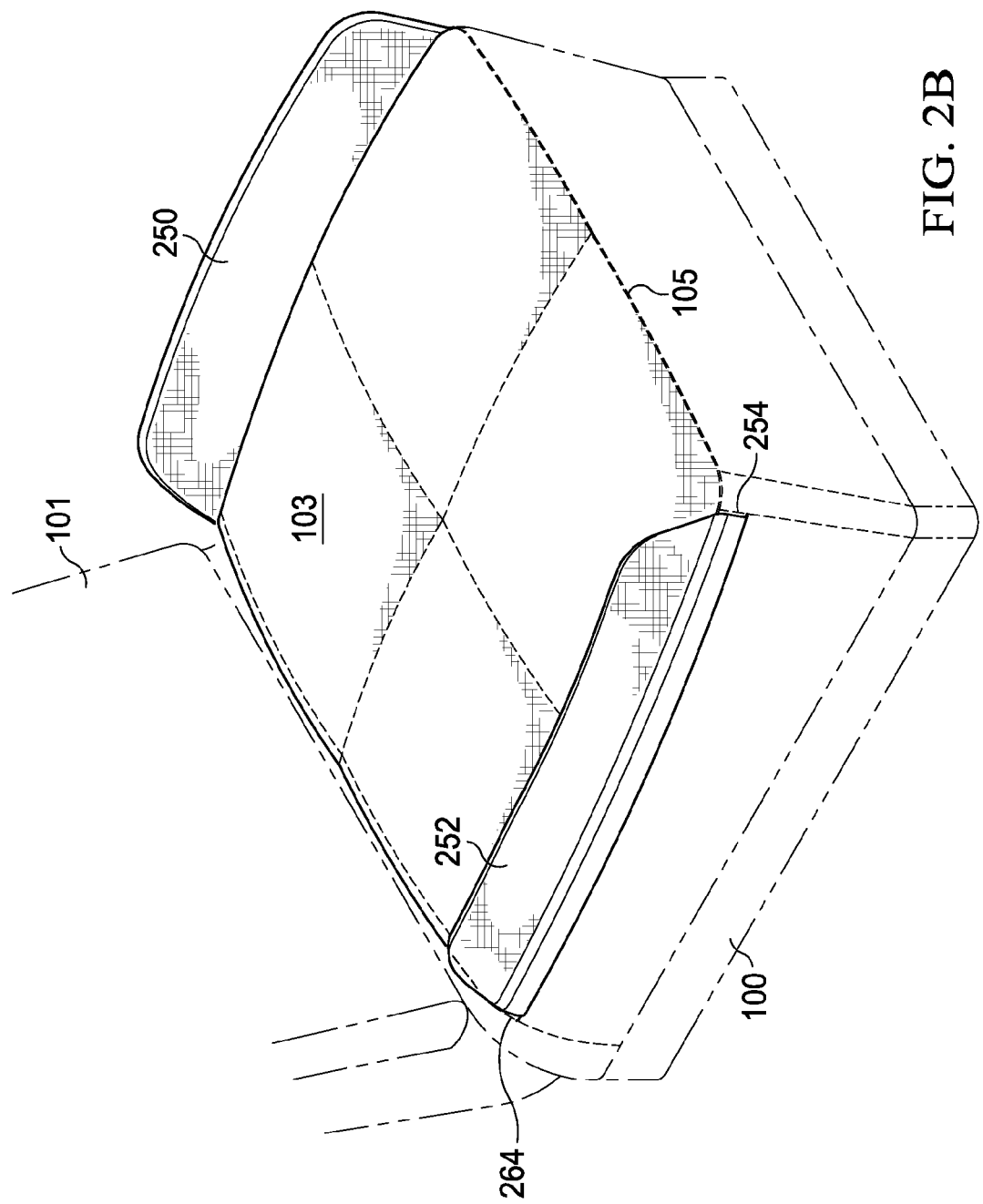
FIG. 2B is a front perspective view of another embodiment of the invention with a portion incorporated into a typical automobile seat upholstery

FIG. 2A shows an exploded view of wall/guard 252. FIG. 2B shows the walls/guards 250 and 252 temporarily secured to the seat 100.

As best seen in FIG. 2C, wall/guard 252 (as well as wall/guard 250) comprises a bent end 253. Bent end 253 is structured to allow wall/guard 252 to slide into the shallow inverted pocket formed from the flap as described above. A securing means is attached to either the seat side wall underneath flap 258, the underside of flap 258, or both. Bent end 253, which further comprises a first inner side 253a and a second inner side 253b, provides a securing means on one or both of said inner sides. The securing means of the bent end 253 is complimentary to the securing means on seat side wall or underneath flap 258. For example, as illustrated in FIG. 2C, the bent end 253 shows a securing means 260 on the second inner side 253b which would be complimentary to a securing means (not shown) on the underside of flap 258. The securing means may be a hook and loop fasteners, snaps, buttons and button holes, reusable adhesive, or any other means that keeps flap 258 and wall/guard 252 temporary secured. Most preferably, hook and loop fastening tape, such as sold under the trademark Velcro® is employed.

Figure 3A:
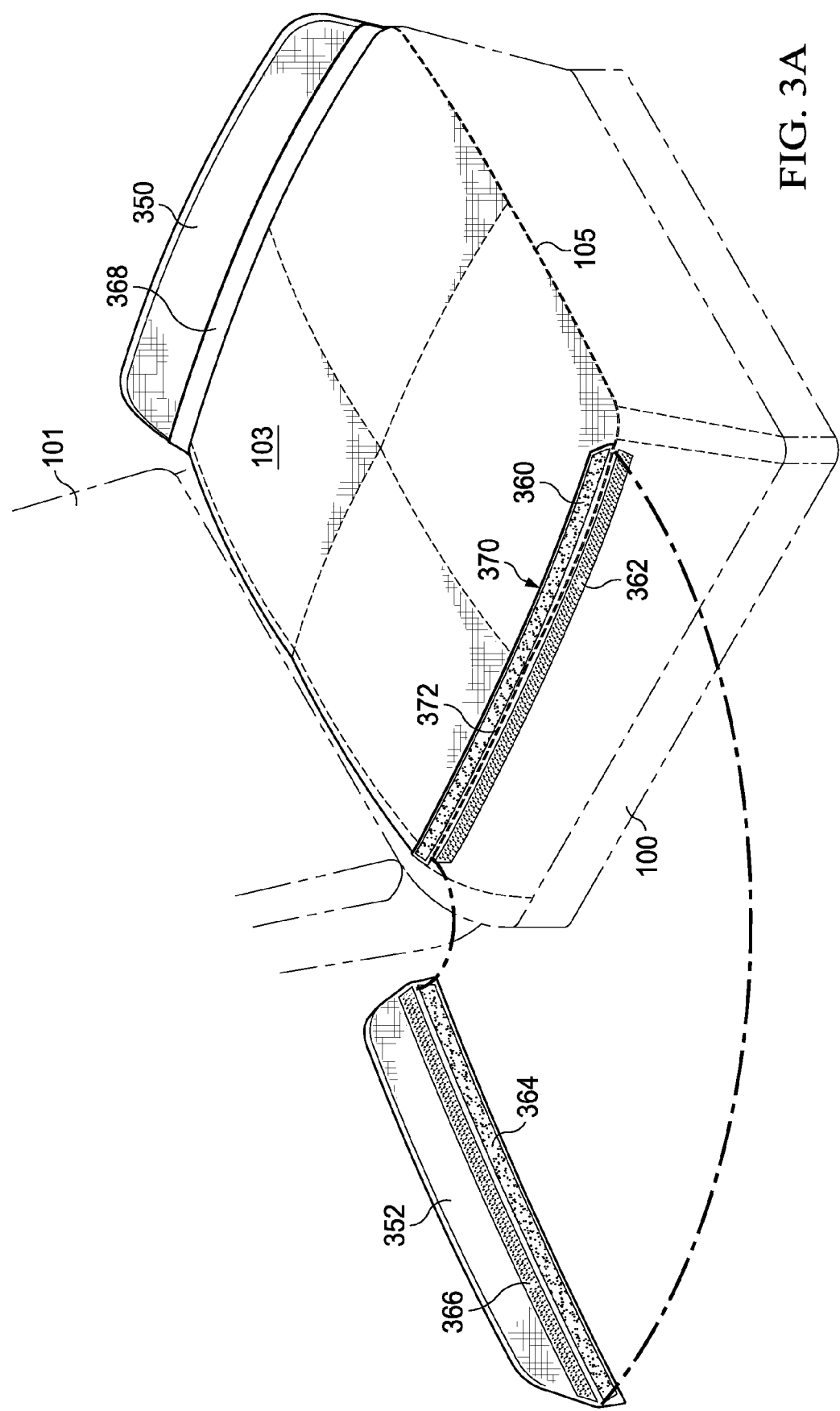
FIG. 3A is a front perspective view of another embodiment of the invention with a portion incorporated into a typical automobile seat upholstery
Figure 3B:
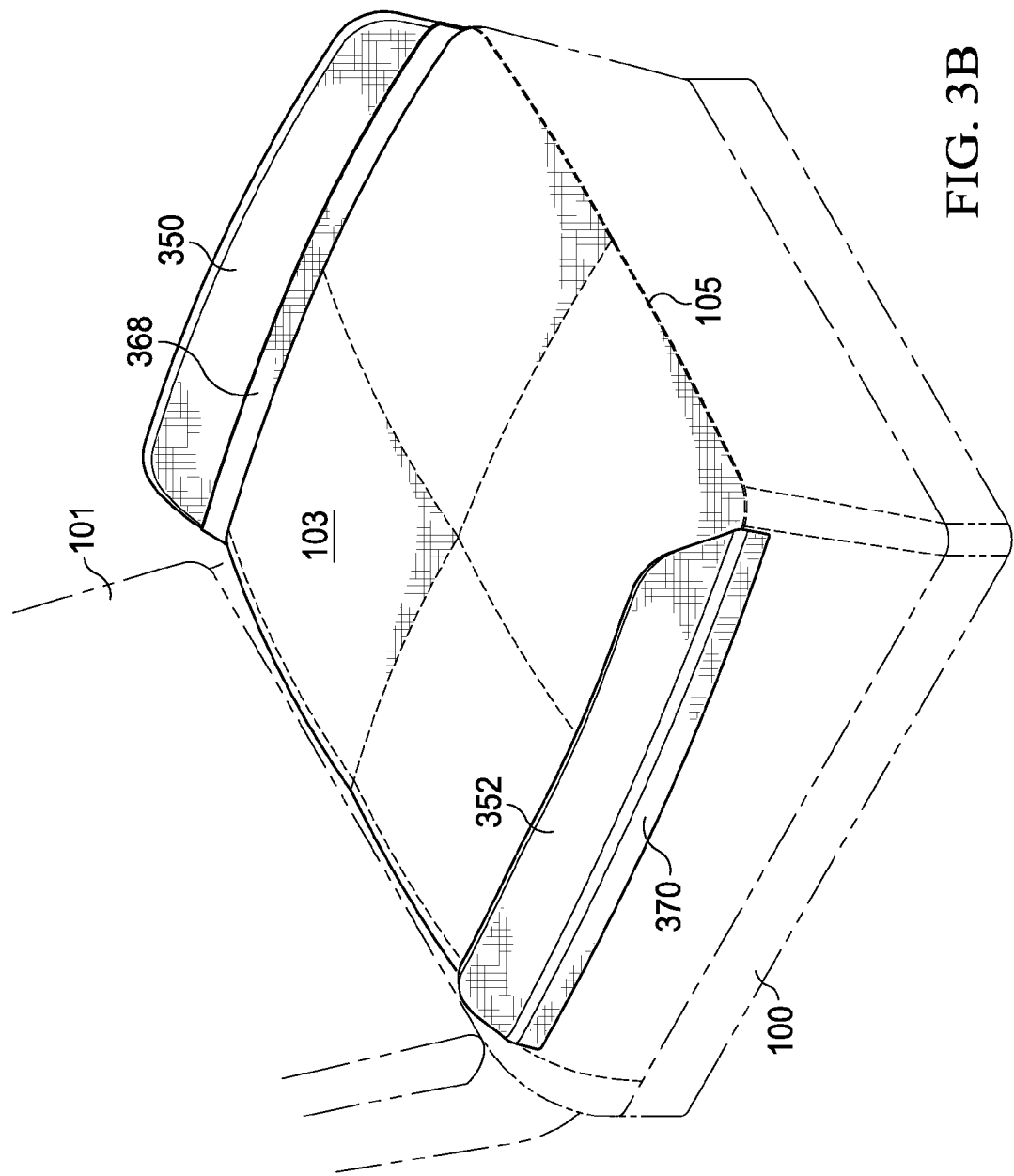
FIG. 3B is a front perspective view of another embodiment of the invention with a portion incorporated into a typical automobile seat upholstery

Now referring to FIGS. 3A and 3B, a second alternate embodiment is shown and comprises detachable walls/guards 350 and 352 and a seat having flaps 368 and 370. Upholstery sitting area 103 has a seat seam 105. Flap 370 comprises a seam edge 372, side edges, an outer edge, an outer side and an underside. Seat seam 105 secures to said seam edge 372 to create a joined seam. Preferably, seam edge 372 will be sewed into seam 105 as shown, but it can be joined with adhesive or with other means used in the upholstery art. Side edges and the outer edge of flap 370 are not secured to the upholstery, allowing flap 370 to lift up. Flap 370 and wall/guard 352 interact in the same manner as wall/guard 350 and flap 368 so it may be assumed that guard 350 and flap 368 act as mirror images of wall/guard 352 and flap 370.

Wall/guard 352 further comprises an inner side and an outer side. The inner side comprises securing means 364 and/or 366. A securing means is also attached to either the seat underneath flap 370 (as depicted by securing means 362), the underside of flap 370 (as depicted by securing means 360), or both. Securing means 362 is complimentary to securing means 364. Likewise, securing means 360 is complimentary to securing means 366. The securing means may be hook and loop fasteners, buttons and button holes, reusable adhesive, snaps, or any other means that keep flap 258 and wall/guard 252 temporarily secured.

Alternate versions may be used, for example, one securing means attached to the seat or flap with the corresponding securing means attached to the wall/guard.

In still another embodiment not illustrated, walls/guards may be temporarily secured to upholstery by the use of fastening means instead of a flap being stitched into a seam of seat upholstery. Such fastening means include, for example, hook and loop fasteners, snaps, zippers, and tacks. A conversion kit may be provided which has one or more walls/guards having a fastening means, and a complementary fastening means which can be attached to the seat by a user.

A seat cover comprising the features described for the seat upholstery may be provided within the bounds of this invention.

Other embodiments may have one wall/guard permanently secured to seat upholstery or seat cover with the other wall/guard removably attached. Also, both wall/guards may be permanently secured to the seat upholstery by sewing, gluing, or other means known in the art.

The height of the wall/guard extending upwardly above the seating area may be varied according to the preference of the user and the type of objects that the user wishes to prevent from slipping into the gap. The height may be different on the medial side as opposed to the door side of the seat.

The walls/guards of the invention may be integrated into the upholstery of any seat, and into seat covers for vehicle seats and similarly dimensioned seats and chairs. While it is envisioned to be particularly useful in the front driver or passenger seat of a vehicle, other seats may benefit by use of the invention such as rear van seats, boat seats, and other seats.

I claim:

1. A seat for a vehicle having a sitting surface and four side walls secured thereto at a side seam, comprising a flap secured to the side seam, a wall assembly securement means attached to said seat, and at least one detachable wall assembly, said wall assembly having a seat attachment means complementary to said wall assembly securement means on said seat.

2. The seat of claim 1, wherein the location of said flap is the medial side of said seat, and wherein said wall assembly once secured thereto prevents objects from falling into the gap defined by a vehicle seat and the console of a passenger vehicle.

3. The seat of claim 1, wherein the location of said flap is the door side of said seat cover, and wherein said wall assembly once secured thereto prevents objects from falling into the gap defined by a vehicle seat and the door of a passenger vehicle.

4. The seat of claim 1, wherein said seat has a flap on the medial side and the door side thereof and wherein two wall assemblies may be secured to said seat cover on the medial and door side respectively.

5. The seat of claim 1, wherein said wall assembly securement means is attached to the side wall of said seat, and wherein said flap has a first downward position which conceals said wall assembly securement means and a second upward position which reveals said wall assembly securement means, whereby when said flap is in said second upward position said wall assembly may be attached to said seat via securement of said complementary fastening means.

6. The seat of claim 1, wherein said flap is secured to said seat along the top edge and the two side edges, forming an inverted pocket, and wherein said flap has an inside surface and an outside surface.

7. The seat of claim 6, wherein said wall assembly securement means is secured to said inside surface of said flap.

8. The seat of claim 6, wherein said wall assembly securement means is secured to said side wall of said vehicle seat, and covered by said flap.

9. The seat of claim 6, wherein said wall assembly has a bent edge having an inner and an outer surface, said bent edge attaching to said seat by slipping upwardly into said inverted pocket and securing to a surface selected from said flap and said side wall.

10. The seat of claim 9, wherein said bent edge inner surface has a fastening means attached thereto and said wall assembly fastening means complementary to said bent edge inner surface fastening means is on said inner flap surface.

11. The seat of claim 9, wherein said bent edge outer surface has a fastening means attached thereon, and said wall assembly fastening means complementary to said bent edge outer surface fastening means is secured to said vehicle seat side wall.

12. A conversion kit for passenger vehicles comprising one or more wall assemblies made of soft semi-sturdy material, wherein each wall assembly has a top edge, a bottom edge, and two side edges and an inner and outer side extending between said edges, and wherein a seat fastening means is attached to the inner side along said bottom edge, and a wall assembly fastening means for securing to a side of a vehicle seat, wherein said seat fastening means and said wall assembly fastening means are complementary.

13. A vehicle seating device comprising a vehicle seat and wall/guard for attachment to the vehicle seat, the wall/guard having a first long side and a second long side and two short sides, said second long side further comprising a bent end, said bent end structured to allow wall/guard to slide into a shallow inverted pocket provided on the vehicle seat.

14. The device of claim 13, wherein said bent end further comprises a first inner side and a second inner side and provides a securing means on one or both of said inner sides wherein said securing means of the bent end are complimentary to securing means inside said shallow inverted pocket.

* * * * *